US007601194B2

United States Patent
Beall et al.

(10) Patent No.: US 7,601,194 B2
(45) Date of Patent: *Oct. 13, 2009

(54) ASYMMETRIC HONEYCOMB WALL-FLOW FILTER HAVING IMPROVED STRUCTURAL STRENGTH

(75) Inventors: Douglas M. Beall, Painted Post, NY (US); Rodney I. Frost, Corning, NY (US); Weiguo Miao, Corning, NY (US)

(73) Assignee: Corning Incorporated, Corning, NY (US)

( * ) Notice: Subject to any disclaimer, the term of this patent is extended or adjusted under 35 U.S.C. 154(b) by 489 days.

This patent is subject to a terminal disclaimer.

(21) Appl. No.: 11/089,642

(22) Filed: Mar. 24, 2005

(65) Prior Publication Data

US 2005/0166562 A1 Aug. 4, 2005

Related U.S. Application Data

(63) Continuation-in-part of application No. 10/671,166, filed on Sep. 25, 2003, now Pat. No. 7,247,184.

(51) Int. Cl.
*B01D 46/00* (2006.01)
*F01N 3/022* (2006.01)
(52) U.S. Cl. .................. 55/523; 55/385.3; 55/DIG. 30; 60/311; 428/116
(58) Field of Classification Search ............... 55/385.3, 55/523, DIG. 30; 428/116, 117, 188, 698; 60/311; 502/527.19
See application file for complete search history.

(56) References Cited

U.S. PATENT DOCUMENTS

| 4,276,071 | A | | 6/1981 | Outland ..................... 55/523 |
| 4,329,162 | A | * | 5/1982 | Pitcher, Jr. .................. 55/523 |
| 4,335,023 | A | | 6/1982 | Dettling et al. ............. 252/466 |
| 4,364,781 | A | | 12/1982 | Vesterlund ................. 148/6.3 |
| 4,416,676 | A | * | 11/1983 | Montierth ................... 55/523 |
| 4,417,908 | A | | 11/1983 | Pitcher, Jr. .................. 55/523 |
| 4,420,316 | A | | 12/1983 | Frost et al. .................. 55/523 |
| 4,521,532 | A | | 6/1985 | Cho .......................... 502/439 |
| 5,256,054 | A | | 10/1993 | Cochetto et al. ............ 425/462 |
| 5,714,228 | A | | 2/1998 | Beckmeyer et al. ........ 428/118 |
| 5,952,079 | A | | 9/1999 | Andou et al. ............... 428/116 |
| 6,159,431 | A | | 12/2000 | Inoue et al. ................. 422/180 |
| 6,464,744 | B2 | | 10/2002 | Cutler et al. .................. 55/482 |

(Continued)

FOREIGN PATENT DOCUMENTS

DE 10037403 A1 2/2002

(Continued)

*Primary Examiner*—Jason M Greene
(74) *Attorney, Agent, or Firm*—Matthew B. McNutt

(57) ABSTRACT

A honeycomb filter includes an array of interconnecting porous walls which define an array of first channels and second channels. The first channels are bordered on their sides by the second channels and have a larger hydraulic diameter than the second channels. The first channels have a square cross-section, with corners of the first channels having a shape, such as a bevel or fillet, such that the thickness, $t_3$, of the porous walls adjoining the corners of the first channels is comparable to the thickness, $t_4$, of the porous walls adjoining edges of the first and second channels. Embodiments having a corner fillet with a radius, $R_c$, are also disclosed. Embodiments wherein $0.30\ t_4 \leq R_c \leq 1.0\ t_4$ exhibit combinations of low wall pressure drop and low thermal stress.

16 Claims, 9 Drawing Sheets

U.S. PATENT DOCUMENTS

| | | | |
|---|---|---|---|
| 6,508,852 B1 | 1/2003 | Hickman et al. | 55/523 |
| 6,570,119 B2 | 5/2003 | Marcher | 219/69.17 |
| 6,696,132 B2 | 2/2004 | Beall et al. | 428/116 |
| 6,803,087 B2 * | 10/2004 | Brew et al. | 55/523 |
| 6,843,822 B2 | 1/2005 | Beall et al. | 55/523 |
| D505,194 S * | 5/2005 | Komori et al. | D23/365 |
| 7,247,184 B2 * | 7/2007 | Frost | 55/523 |
| 2005/0016140 A1 | 1/2005 | Komori et al. | 55/523 |
| 2005/0016141 A1 | 1/2005 | Hong et al. | 55/523 |
| 2005/0066639 A1 | 3/2005 | Frost | 55/523 |
| 2005/0076627 A1 | 4/2005 | Itou et al. | 55/523 |
| 2005/0166562 A1 | 8/2005 | Beall et al. | 55/523 |
| 2005/0191461 A1 | 9/2005 | Kasai et al. | 428/116 |
| 2005/0274097 A1 | 12/2005 | Beall et al. | 55/523 |

FOREIGN PATENT DOCUMENTS

| | | | | |
|---|---|---|---|---|
| EP | 1495791 A1 | 1/2005 | | |
| EP | 1 502 639 | 2/2005 | | 39/20 |
| EP | 1568406 A1 | 8/2005 | | |
| FR | 2789327 A1 | 2/1999 | | |
| JP | 1172155 | 4/2003 | | 23/1 |
| JP | D1172155 | * 4/2003 | | 23/1 |
| JP | 1189138 | 11/2003 | | 23/1 |
| JP | 1189139 | 11/2003 | | 23/1 |
| JP | 1189428 | 11/2003 | | 23/1 |

* cited by examiner

Fig. 6
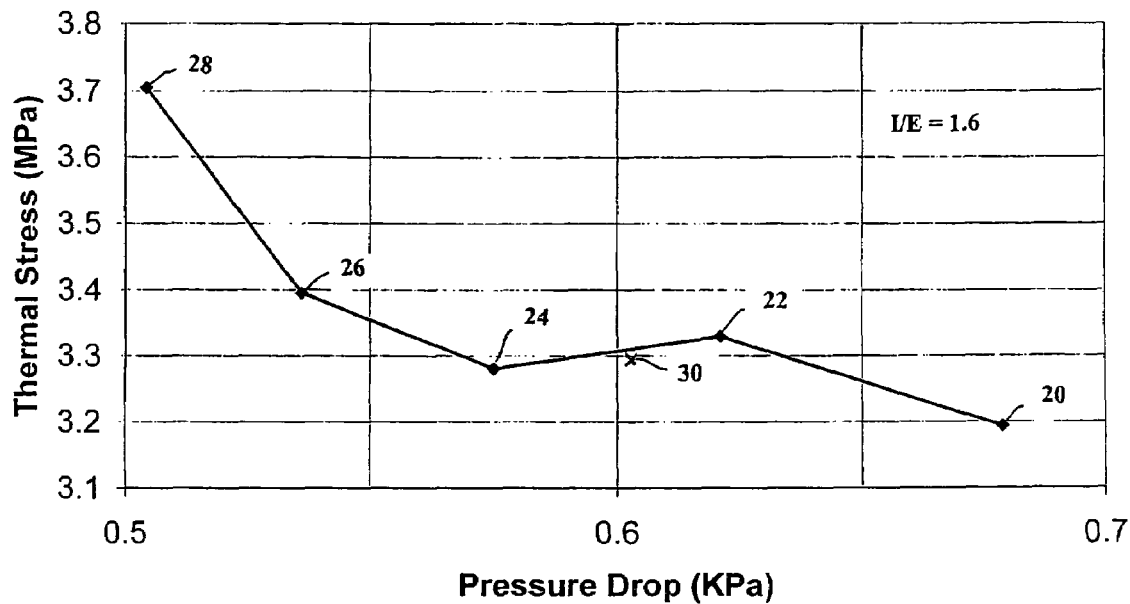
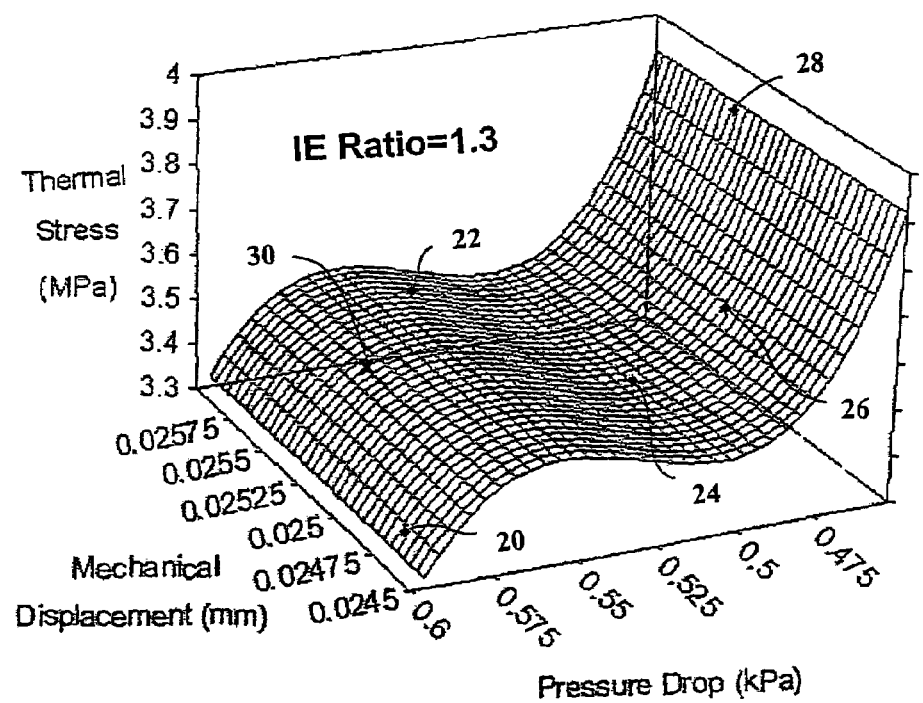
Fig. 7

ASYMMETRIC HONEYCOMB WALL-FLOW FILTER HAVING IMPROVED STRUCTURAL STRENGTH

RELATED INVENTIONS

The present application is a continuation-in-part application of U.S. patent application Ser. No. 10/671,166 filed Sep. 25, 2003, entitled "Asymmetric Honeycomb Wall-Flow Filter Having Improved Structural Strength," now U.S. Pat. No. 7,247,184 of the same title and issued on Jul. 24, 2007.

BACKGROUND OF INVENTION

Honeycomb wall-flow filters are used to remove carbonaceous soot from exhaust of diesel engines. FIG. 1A shows a conventional honeycomb wall-flow filter 100 having an inlet end 102, an outlet end 104, and an array of interconnecting porous walls 106 extending longitudinally from the inlet end 102 to the outlet end 104. The interconnecting porous walls 106 define a grid of inlet channels 108 and outlet channels 110. At the inlet end 102, the outlet channels 110 are end-plugged with filler material 112 while inlet channels 108 are not end-plugged. Although not visible from the figure, at the outlet end 104, the inlet channels 108 are end-plugged with filler material while the outlet channels 110 are not end-plugged. Each inlet channel 108 is bordered on all sides by outlet channels 110 and vice versa. FIG. 1B shows a close-up view of the cell structure used in the honeycomb filter. The porous walls 106 defining the inlet and outlet channels (or cells) 108, 110 are straight, and the inlet and outlet cells 108, 110 have a square cross-section and equal hydraulic diameter.

Returning to FIG. 1A, diesel exhaust flows into the honeycomb filter 100 through the unplugged ends of the inlet channels 108 and exits the honeycomb filter through the unplugged ends of the outlet channels 110. Inside the honeycomb filter 100, the diesel exhaust is forced from the inlet channels 108 into the outlet channels 110 through the porous walls 106. As diesel exhaust flows through the honeycomb filter 100, soot and ash particles accumulate on the porous walls 106, decreasing the effective flow area of the inlet channels 108. The decreased effective flow area creates a pressure drop across the honeycomb filter, which leads to a gradual rise in back pressure against the diesel engine. When the pressure drop becomes unacceptable, thermal regeneration is used to remove the soot particles trapped in the honeycomb filter. The ash particles, which include metal oxide impurities, additives from lubrication oils, sulfates and the like, are not combustible and cannot be removed by thermal regeneration. During thermal regeneration, excessive temperature spikes can occur, which can thermally shock, crack, or even melt, the honeycomb filter.

It is desirable that the honeycomb filter has sufficient structural strength to withstand thermal regeneration and canning. To avoid the need for frequent thermal regeneration, it is also desirable that the honeycomb filter has a high capacity for storing soot and ash particles. For a cell structure in which the inlet and outlet channels have equal hydraulic diameter, the effective flow area of the inlet channels can easily become much smaller than that of the outlet channels, creating a large pressure drop across the honeycomb filter. One solution that has been proposed to reducing this pressure drop involves making the hydraulic diameter (or effective cross-sectional flow area) of the inlet channels larger than that of the outlet channels. In this way, more soot and ash particles may accumulate on the inlet portion of the porous walls, i.e., the storage capacity is better and the pressure drop over time is reduced.

For the conventional honeycomb cell structure shown in FIG. 1B, the hydraulic diameter of the inlet cells 108 can be made larger than the outlet cells 110 by reducing the hydraulic diameter of the outlet cells 110. FIG. 1C shows the honeycomb cell structure of FIG. 1B after reducing the hydraulic diameter of the outlet cell 110 such that the outlet cell 110 now has a smaller hydraulic diameter in comparison to the inlet cell 108. Another modification that can be made is to increase the hydraulic diameter of the inlet cells 108. This modification has the advantage of increasing the effective surface area available for collecting soot and ash particles in the inlet portion of the honeycomb filter, which ultimately increases the overall storage capacity of the honeycomb filter. FIG. 1D shows the honeycomb cell structure of FIG. 1C after increasing the hydraulic diameter of the inlet cell 108. Without changing the cell density of the honeycomb filter, any increase in the hydraulic diameter of the inlet cell 108 would produce a corresponding decrease in the thickness of the wall between the adjacent corners of inlet cells 108 (compare $t_2$ in FIG. 1D with $t_1$ in FIG. 1C). As the wall between the corners of the inlet cells become thinner, the structural strength of the honeycomb filter decreases, making the honeycomb filter more susceptible to thermal shock and cracking during thermal regeneration.

From the foregoing, there is desired a method of improving the storage capacity of the honeycomb filter while maintaining good flow rates through the honeycomb filter without significantly reducing the structural strength of the honeycomb filter.

SUMMARY OF INVENTION

In one aspect, the invention relates to a honeycomb filter which comprises an array of interconnecting porous walls that define an array of first channels and second channels. The first channels are bordered on their sides by the second channels and have a larger hydraulic diameter than the second channels. The first channels have a square cross-section, with corners of the first channels having a shape such that the thickness of the porous walls adjoining corners of the first channels is comparable to the thickness of the porous walls adjoining edges of the first and the second channels. Preferably, the first channels are end-plugged at a first end of the honeycomb filter and the second channels are end-plugged at a second end of the honeycomb filter so that flow into the first channels pass through the porous walls and then out of the honeycomb filter through the second channels.

According to a preferred aspect, the thickness, $t_3$, of the porous walls adjoining the corners of the first channels are between 0.8 and 1.2 times the thickness, $t_4$, of the porous walls adjoining the edges of the first and the second channels. The shapes of the corners of the larger hydraulic first channels preferably include either fillets or bevels. Fillets are most preferred as they provide the lowest combinations of wall pressure loss and thermal stress.

According to another preferred aspect of the invention, the corners of the larger first channels include fillets with a corner radius, $R_c$, selected such that $R_c \geq 0.30\ t_4$. Additionally, the ratio of the hydraulic areas of the first (Inlet) channels to the hydraulic areas of the second (Exit) channels, the I/E ratio, is between 1.1 and 2.0, and in preferred embodiments less than 1.5; with more preferred embodiments being between 1.1 and 1.5; and most preferably between 1.2 and 1.4.

Embodiments having an I/E ratio, defined as a width dimension of the first channels divided by a width dimension of the second channels, above 1.5 and wherein the corner fillet radius is selected such that $R_c \geq 0.50\ t_4$ have lower pressure drop for comparable thermal mass as compared to beveled corner designs.

According to another yet aspect of the invention, the corners of the first larger channels include fillets with a corner radius, $R_c$, having the relationship wherein $R_c \leq 1.0\ t_4$. Achieving this relationship ensures that the thermal stresses in the ceramic article are not too large.

According to a further aspect of the invention, the corners of the first larger channels preferably include fillets including a radius, $R_c$, wherein $0.30\ t_4 \leq R_c \leq 1.0\ t_4$. It was discovered that achieving this range of fillet corner radius lowers pressure drop and also limits thermal stresses in the article. More preferably, the fillet includes a radius, $R_c$, wherein $0.50\ T_4 \leq R_c \leq 1.0\ t_4$.

According to yet another aspect of the invention, a honeycomb filter is provided which comprises an array of interconnecting porous walls defining an array of first channels and second channels, the first channels being bordered on their sides by the second channels and having a larger hydraulic diameter than the second channels wherein a ratio of the hydraulic diameter of the first channels to the hydraulic diameter of the second channels is between 1.1 to 1.5, the first channels have a square cross-section, with corners having a fillet with a corner radius, $R_c$, such that a thickness ($t_3$) of the porous walls adjoining corners of the first channels is in a range of about 0.8 to 1.2 times the thickness ($t_4$) of the porous walls adjoining edges of the first and the second channels, and wherein the corner radius, $R_c$, is selected such that $0.30\ t_4 \leq R_c \leq 1.0\ t_4$.

In another aspect, the invention relates to a honeycomb filter which comprises an array of interconnecting porous walls that define an array of first channels having a square cross-section and second channels having a square cross-section. The first channels are bordered on their edges by the second channels. The edges of the first channels are aligned with edges of the bordering second channels. The first channels have a larger hydraulic diameter than the second channels.

In yet another aspect, the invention relates to an extrusion die assembly for making a honeycomb filter which comprises a cell forming die having a central region and a peripheral region. The central region comprises an array of discharge slots cut to define an array of first and second pins and an array of first feedholes in communication with the array of discharge slots. The peripheral region comprises at least a second feedhole. The first pins have a larger cross-sectional area than the second pins. The cross-sectional shape of the first pins is selected such that the width of the discharge slots is substantially uniform. The extrusion die assembly also includes a skin forming mask mounted coaxially with the cell forming die and radially spaced from the cell forming die so as to define a skin slot that is in selective communication with the at least second feedhole.

Other features and advantages of the invention will be apparent from the following description and the appended claims.

BRIEF DESCRIPTION OF DRAWINGS

FIGS. 5-6 are graphs of thermal stress vs. wall pressure drop according to embodiments of the invention.

FIGS. 7-8 are 3-D graphs of wall pressure drop, mechanical displacement, and thermal stress according to embodiments of the invention.

DETAILED DESCRIPTION OF PREFERRED EMBODIMENTS

The invention will now be described in detail with reference to a few preferred embodiments, as illustrated in the accompanying drawings. In the following description, numerous specific details are set forth in order to provide a thorough understanding of the invention. It will be apparent, however, to one skilled in the art that the invention may be practiced without some or all of these specific details. In other instances, well-known features and/or process steps have not been described in detail in order to not unnecessarily obscure the invention. The features and advantages of the invention may be better understood with reference to the drawings and discussions that follow.

Figure 2A:
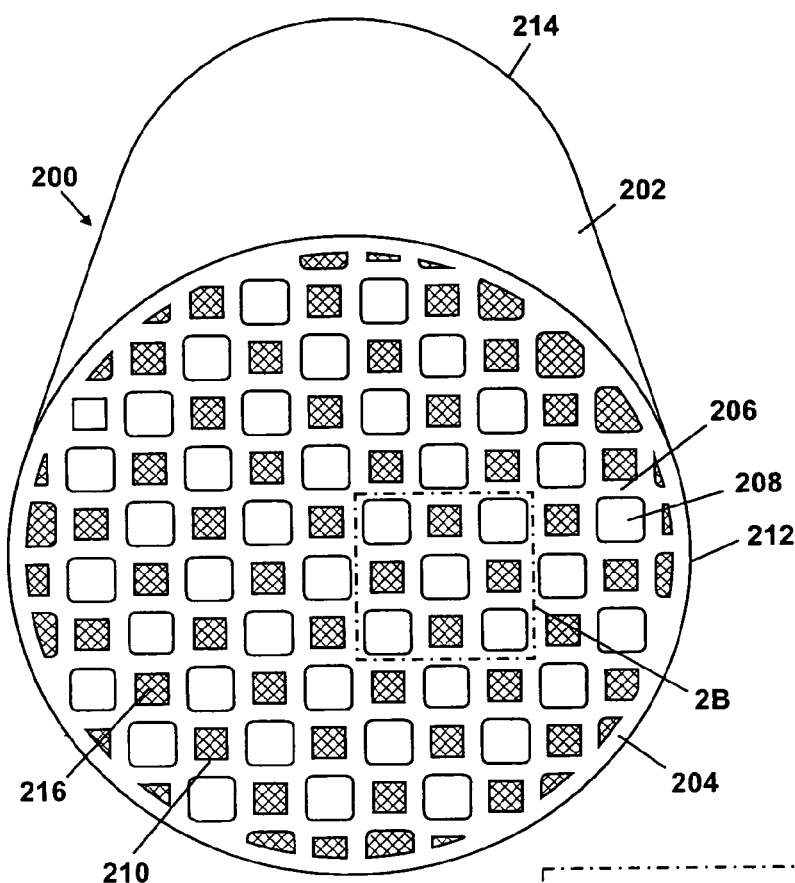
FIG. 2A is a perspective view of a honeycomb wall-flow filter according to an embodiment of the invention.

For illustration purposes, FIG. 2A shows a honeycomb wall-flow filter 200 according to an embodiment of the invention. The honeycomb filter 200 has a columnar body 202 whose cross-sectional shape is defined by a skin (or peripheral wall) 204. The profile of the skin 204 is typically circular or elliptical, but the invention is not limited to any particular skin profile. The columnar body 202 has an array of interconnecting porous walls 206, which intersect with the skin 204. The porous walls 206 define a grid of inlet channels 208 and outlet channels 210 in the columnar body 202. The inlet and outlet channels 208, 210 extend longitudinally along the length of the columnar body 202. Typically, the columnar body 202 is made by extrusion. Typically, the columnar body 202 is made of a ceramic material, such as cordierite, aluminum titanate, or silicon carbide, but could also be made of other extrudable materials, such as glass, glass-ceramics, plastic, and metal.

The honeycomb filter 200 has an inlet end 212 for receiving flow, e.g., exhaust gas flow, and an outlet end 214 through which filtered flow can exit the honeycomb filter. At the inlet end 212, end portions of the outlet channels 210 are plugged with filler material 216 while the end portions of the inlet channels 208 are not plugged. Typically, the filler material 216 is made of a ceramic material, such as cordierite, aluminum titanate, or silicon carbide. Although not visible from the figure, at the outlet end 214, end portions of inlet channels 208 are plugged with filler material while the end portions of the outlet channels 210 are not plugged. Partial cells near the periphery of the skin 204 are typically plugged with filler material. Inside the honeycomb filter 200, the interconnected porous walls 206 allow flow from the inlet channels 208 into the outlet channels 210. The porosity of the porous walls 206 can be variable. In general, the porosity should be such that the structural integrity of the honeycomb filter is not compromised. For diesel filtration, the porous walls 206 may incorporate pores having mean diameters in the range of 1 to 60 µm, more preferably in a range from 10 to 50 µm.

Figure 2B:
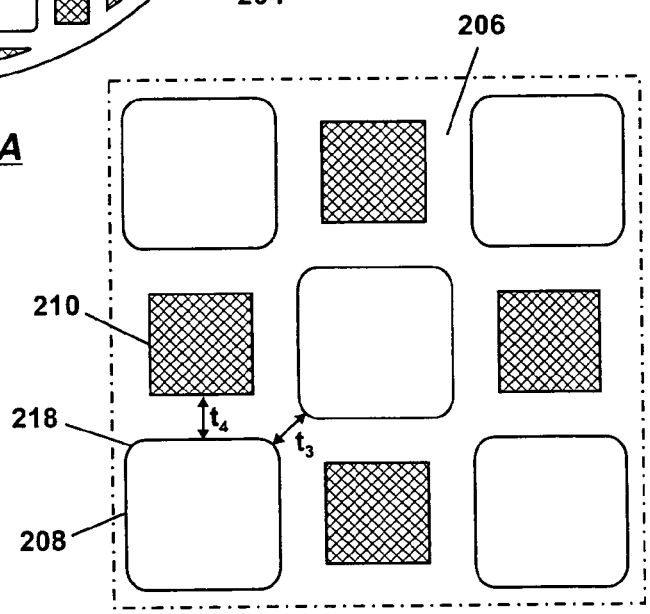
FIG. 2B shows a honeycomb cell structure having inlet cells and outlet cells with unequal hydraulic diameters and the inlet cells with filleted corners according to one embodiment of the invention.

FIG. 2B shows a close-up view of the cell structure of the honeycomb filter 200. Each inlet cell 208 is bordered by outlet cells 210 and vice versa. To maintain good flow rates when the honeycomb filter 200 is in use, the inlet cells 208 are made to have a larger hydraulic diameter than the outlet cells 210. In the illustration, the outlet cells 210 have a square geometry. In the illustration, the inlet cells 208 also have a square geometry, but the corners of the square include fillets 218. One purpose of the fillets 218 is to make the thickness ($t_3$) between the adjacent corners of the inlet cells 208 comparable to the thickness ($t_4$) between the inlet cells 208 and the outlet cells 210. In one embodiment, the thickness ($t_3$) between the corners is in a range of about 0.8 to 1.2 times the thickness ($t_4$) of the wall portion between the inlet and outlet cells. Preferably, the radius of the fillets 218 is selected such that the thickness of the porous walls is substantially uniform around the cells. The radius of the fillets 218 may also be selected such that hydraulic diameter of the inlet cells 208 is maximized for a selected cell density and closed frontal area.

Figure 1A:
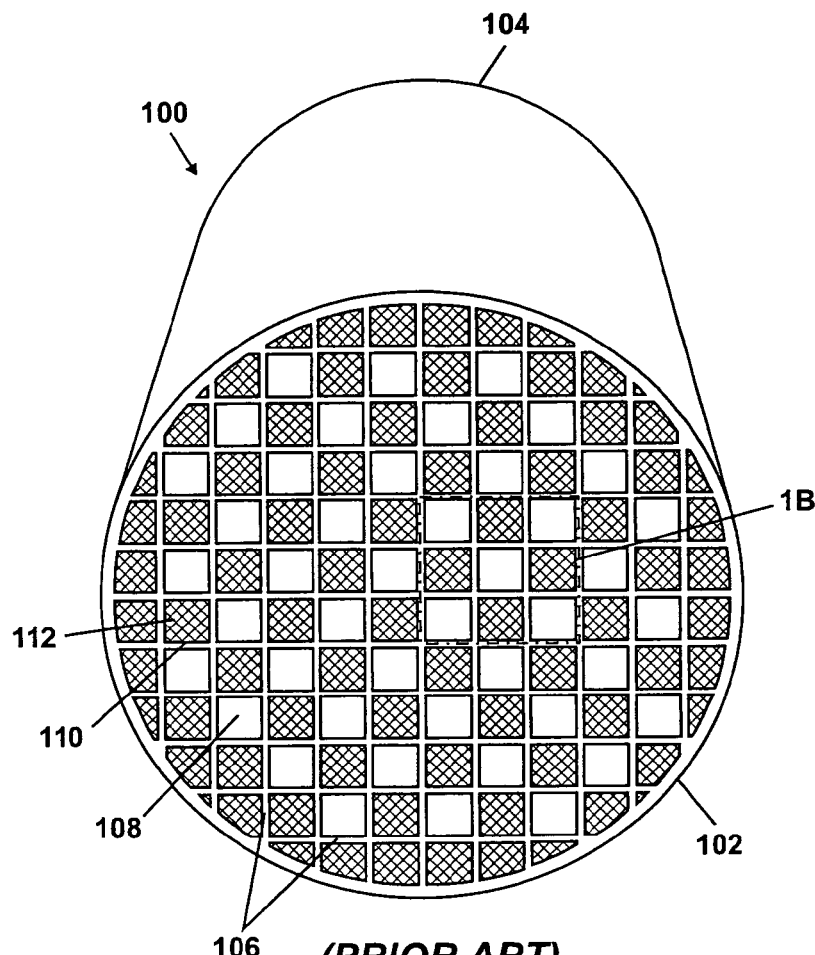
FIG. 1A is a perspective view of a prior-art honeycomb wall-flow filter.
Figure 1B:
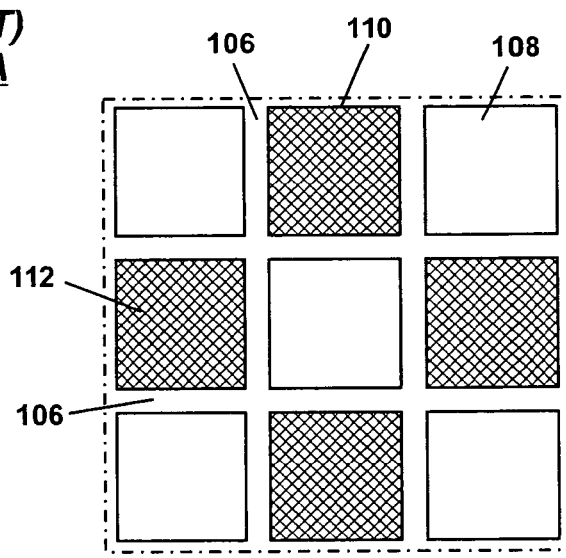
FIG. 1B shows a standard honeycomb cell structure having inlet and outlet cells with equal hydraulic diameter.
Figure 1C:
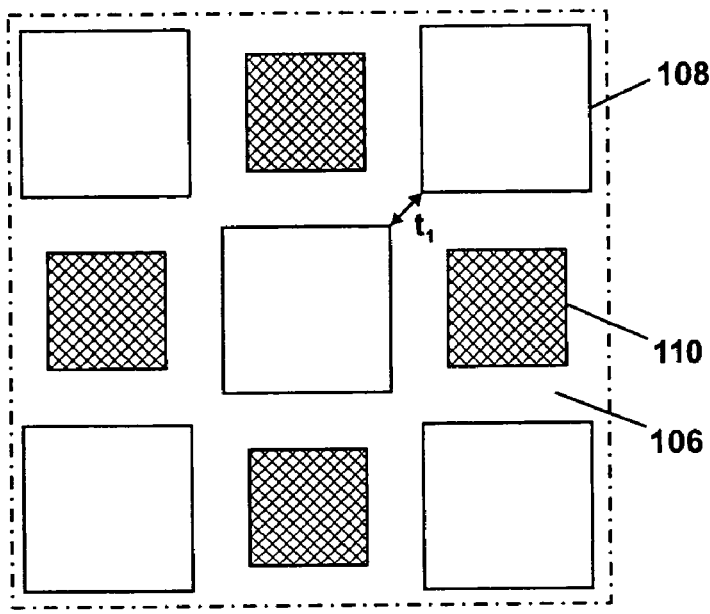
FIG. 1C shows the honeycomb cell structure of FIG. 1B after reducing the hydraulic diameter of the outlet cells.
Figure 1D:
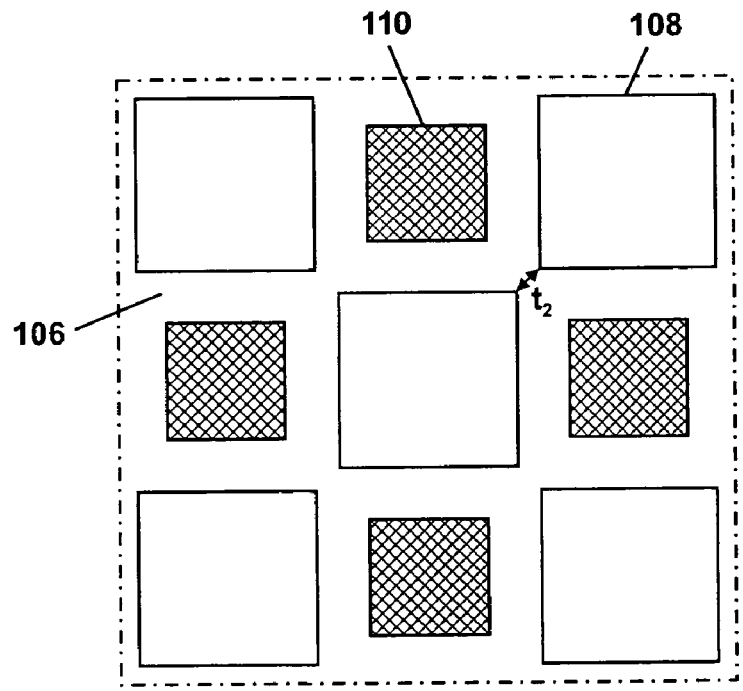
FIG. 1D shows the honeycomb cell structure of FIG. 1C after increasing the hydraulic diameter of the inlet cells.

Table 1 below shows examples of cell structures having a cell density of 200 cells/in² (about 31 cells/cm²) and a closed frontal area of 47%. Cell structures A and B are specific examples of the inventive cell structure shown in FIG. 2B. Cell structures C and D are specific examples of the prior-art cell structure shown in FIG. 1C.

TABLE 1

| Cell Structure | Inlet cell hydraulic diameter (mm) | Ratio of inlet cell hydraulic diameter to outlet cell hydraulic diameter | Inlet cell width (mm) | Outlet cell width (mm) | Fillet radius (mm) | Thickness between adjacent corners of inlet cells (mm) |
|---|---|---|---|---|---|---|
| A | 1.68 | 1.7 | 1.59 | 0.98 | 0.30 | 0.54 |
| B | 1.73 | 2.0 | 1.64 | 0.88 | 0.30 | 0.47 |
| C | 1.59 | 1.7 | 1.59 | 0.93 | None | 0.28 |
| D | 1.64 | 2.0 | 1.64 | 0.83 | None | 0.22 |

Hydraulic diameter, $D_H$, of a cell is defined as follows:

$$D_H = \frac{4A}{P} \quad (1)$$

where A is the cross-sectional area of the cell and P is the wetted perimeter of the cell. For a square cell, the hydraulic diameter is the width of the cell. For a square cell with filleted corners, the hydraulic diameter is larger than the width of the cell.

Figure 2C:
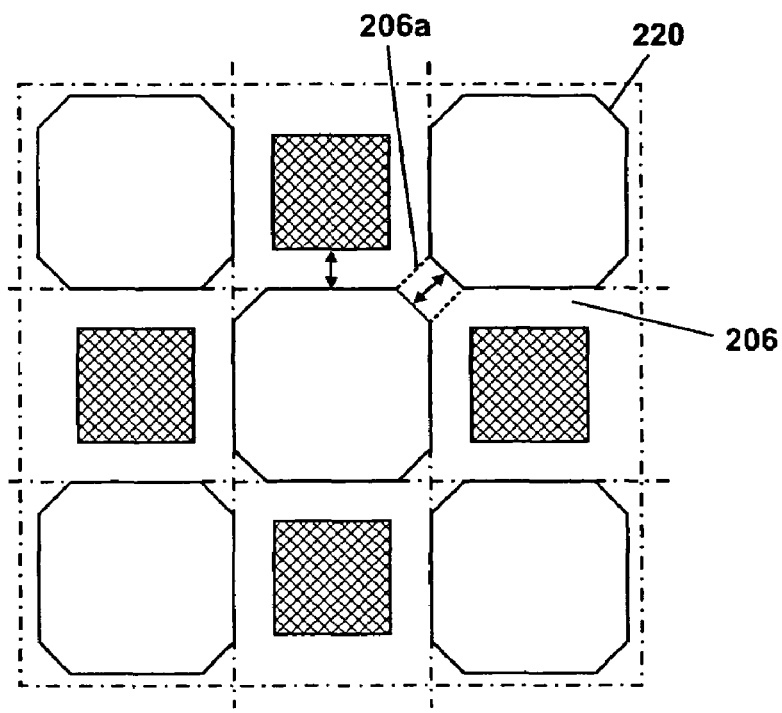
FIG. 2C shows a honeycomb cell structure having inlet cells and outlet cells with unequal hydraulic diameters and the inlet cells with beveled corners according to another embodiment of the invention.

From Table 1 above, the hydraulic diameters of the inlet cells of the inventive cell structures A and B are larger than the hydraulic diameters of the inlet cells of the prior-art cell structures C and D, respectively. The larger hydraulic diameters of the cell structures A and B are achieved while maintaining the same cell density and closed frontal area as that of the prior-art cell structures C and D. FIG. 2E shows how hydraulic diameter varies as a function of fillet radius for a given cell width. The position of the cell structures A, B, C, and D are indicated on the graph. The graph shows that hydraulic diameter has a non-linear relationship with fillet radius. In practice, the inlet cells can be made to have the fillet radius corresponding to the maximum hydraulic diameter achievable for a selected cell width.

Returning to FIG. 2B, the present invention is not limited to inclusion of fillets 218 at the corners of the inlet cells 208. The corners of the inlet cells 208 could be beveled, for example. FIG. 2C shows a cell structure where the corners of the inlet cells 208 include bevels 220. In this embodiment, the inlet cells 208 have also been enlarged such that the edges of (diagonally) adjacent inlet cells 208 are substantially aligned. This increases the overall storage capacity of the honeycomb filter while allowing good flow rates through the honeycomb filter to be maintained. The bevels 220 (or fillets if used instead of bevels) enable uniformly thick porous walls 206 to be provided around the cells. For the cell structures shown in FIGS. 2B and 2C, and particularly in FIG. 2C, the porous walls 206 are not straight. This leads to an increase in the thermal shock resistance of the honeycomb structure. In the design shown in FIG. 2C, portions of the porous walls, e.g., porous wall 206a, are common to only the inlet cells 208. These porous wall portions that are common to only the inlet cells 208 could facilitate transfer of heat from one inlet cell to another during thermal regeneration.

The fillets and bevels can be used to achieve a substantially uniform porous wall thickness throughout the honeycomb filter while maintaining a desired closed frontal area, cell density, and ratio of hydraulic diameter of inlet cell to outlet cell. Typically, a ratio of hydraulic diameter of inlet cell to outlet cell in a range from 1.1 to 2.0, more preferably 1.3 to 2.0. For diesel particulate filtration, a honeycomb having cell density in a range from 10 to 300 cells/in² (about 1.5 to 46.5 cells/cm²), more typically in a range from 100 to 300 cells/in² (about 15.5 to 31 cells/cm²), is considered useful to provide sufficient thin wall surface area in a compact structure. The thickness of the interconnecting porous walls can vary upwards from the minimum dimension of about 0.002 in. (0.05 mm) providing structural integrity, but is generally less than about 0.060 in (1.5 mm) to minimize filter volume. A porous wall thickness in a range of about 0.010 to 0.030 in. (about 0.25 to 0.76 mm), preferably in a range from about 0.010 to 0.025 in. (about 0.25 to 0.64 mm), is most often selected at the preferred cell densities.

According to further aspects of the invention, is has been discovered that corner fillets are more preferable over corner bevels within certain desirable ranges of inlet-to-exit cell dimension ratios (I/E ratios). For example, it has been discovered that in order to reduce the principle mechanical stress in the ceramic article, it is preferred that the corners of the inlet cells 208 include a radius. For a particular design having a wall thickness, $t_4$, of about 0.0165 inch, it has been found that a corner radii of greater than 0.005 inch provides a significant reduction in stress as compared to designs including no corner fillets in the inlet cells (See Table 2 below). Larger radii designs also reduce stress as compared to non-filleted designs. Designs including a range of radii from 0.005-0.020 inch have also been calculated to improve the stress as compared to non-filleted designs. Thus, for mechanical stress reasons alone, the corner radius for such a design should be 0.005 inch or larger. More particularly, the corner fillet radius, $R_c$, as a function of the wall thickness, $t_4$, should be selected such that:

$$R_c \geq 0.30\, t_4.$$

TABLE 2

Maximum Principle Stress versus Corner Radius

| | Corner Radius (inch) | | | | |
|---|---|---|---|---|---|
| | No Fillet | 0.005 inch Fillet | 0.010 inch Fillet | 0.015 inch Fillet | 0.020 inch Fillet |
| Max Stress (MPa) | 7.2 | 2.79 | 3.35 | 3.95 | 3.5 |

Figure 4:
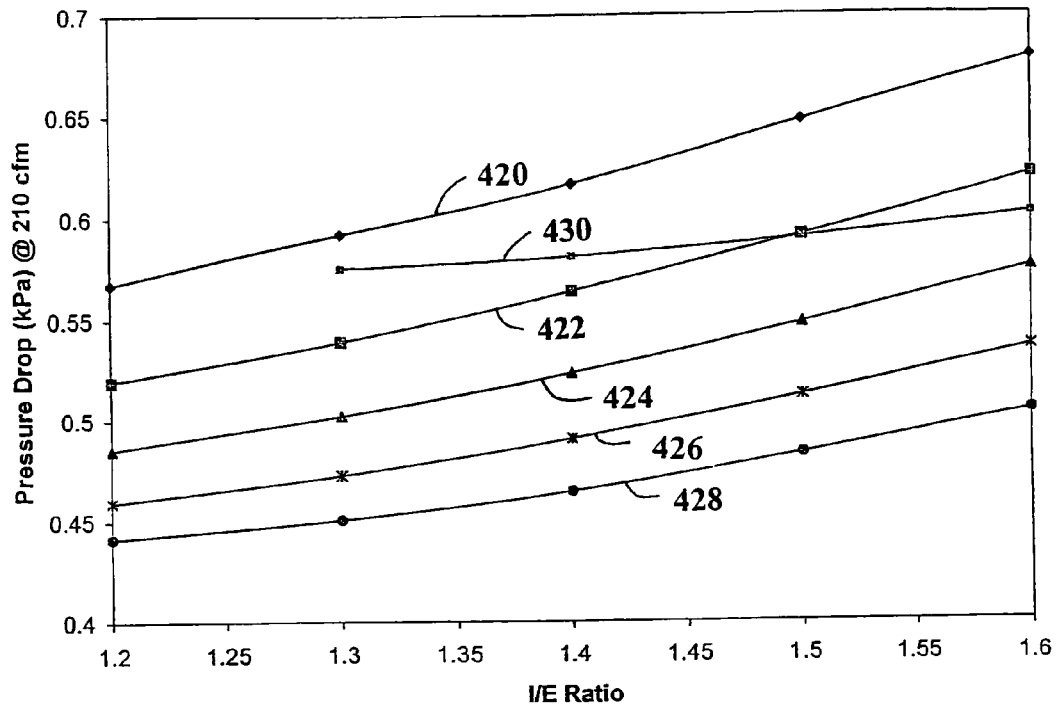
FIG. 4 is a graph of wall pressure drop vs. inlet/exit dimension ratio (I/E ratio) according to embodiments of the invention.

Additionally, it has been discovered that by increasing the corner fillet radius, $R_c$, the wall pressure drop (in kPa) through the porous walls 206 can desirably be made lower. All calculations for thermal stress, and wall pressure drop disclosed herein in FIGS. 4-8 are at 210 CFM for a ceramic article having a 5.66 inch diameter, a 6.0 inch overall length, and a cell density of 270 cells/inch. FIG. 4, for example, demonstrates that for larger corner radii, $R_c$, the wall pressure drop reduces across the entire range of I/E ratios (approx. 1.2-1.6). I/E ratio, as used herein, is defined as the ratio of the inlet cell width dimension divided by the exit cell width dimension. For square-shaped designs described herein, the width is simply the width of the square. For irregularly shaped cell designs, i.e., ones for which a representative width of the inlet and exit cells is difficult to determine, the ratio of the hydraulic diameters of the respective inlet and exit cells provides a good estimate of the I/E ratio. In particular, the lines labeled 420-428 compare designs having no fillets with designs with various corner fillets. For example, line 420 is representative of designs that have no corner fillet for various I/E ratios; line 422 represents a family of designs with a 0.005 inch fillet radius; line 424 represents embodiments with a 0.010 inch fillet radius, line 426 embodiments have a 0.015 inch fillet radius, and line 428 embodiments include a 0.020 inch fillet radius. An I/E ratio above 1.6 is not desired as such designs may incur an overall pressure drop penalty. Designs having area I/E ratios equal to or less than 1.5 are most preferred, with I/E ratios of between 1.2 and 1.4 being even more preferred. Therefore, looking at wall pressure drop alone, it should be recognized that it is most desirable to have larger corner radii, $R_c$. Larger corner radii results in thinner walls and, therefore, lower wall pressure drop. Thus, similar to the analysis above for mechanical stress, for wall pressure drop reasons, it is most desirable that for I/E ratios of less than 1.5, that the corner radius, $R_c$, be selected such that:

$$R_c \geq 0.30\, t_4.$$

If the I/E ratio is above 1.5, then the corner radius, Rc, should follow the relationship:

$$R_c \geq 0.50\, t_4.$$

This relationship is believed to result in a wall pressure drop that will be better than a beveled design of the same thermal mass. Thus, it should be recognized that, as shown in FIG. 4, for a corner radii, $R_c$, of 0.005 inch and an I/E ratio of 1.5 or less, the calculated wall pressure drop of this radiused design is less than for a comparable beveled design with the same thermal mass (labeled 430). It should also be recognized from FIG. 4, that as the corner radius becomes larger (e.g., for a 0.010 inch corner fillet radius, $R_c$), the improvement as compared to a beveled corner design is evidenced for all articles having an I/E ratio of 1.6 and below. For example, for comparable filleted and beveled corner designs at an I/E ratio of about 1.3, it can be seen that an approximately 12% reduction in calculated wall pressure drop is achieved for the filleted corner design having a corner radius of 0.005 inch as compared to the beveled corner design of comparable thermal mass. Thus, it has been discovered that certain filleted corner designs unexpectedly offer an advantage of lower wall pressure drop as compared to beveled designs for certain desired ranges of I/E ratio. Accordingly, fillet corners are more preferred as compared to beveled corners.

Figure 5:
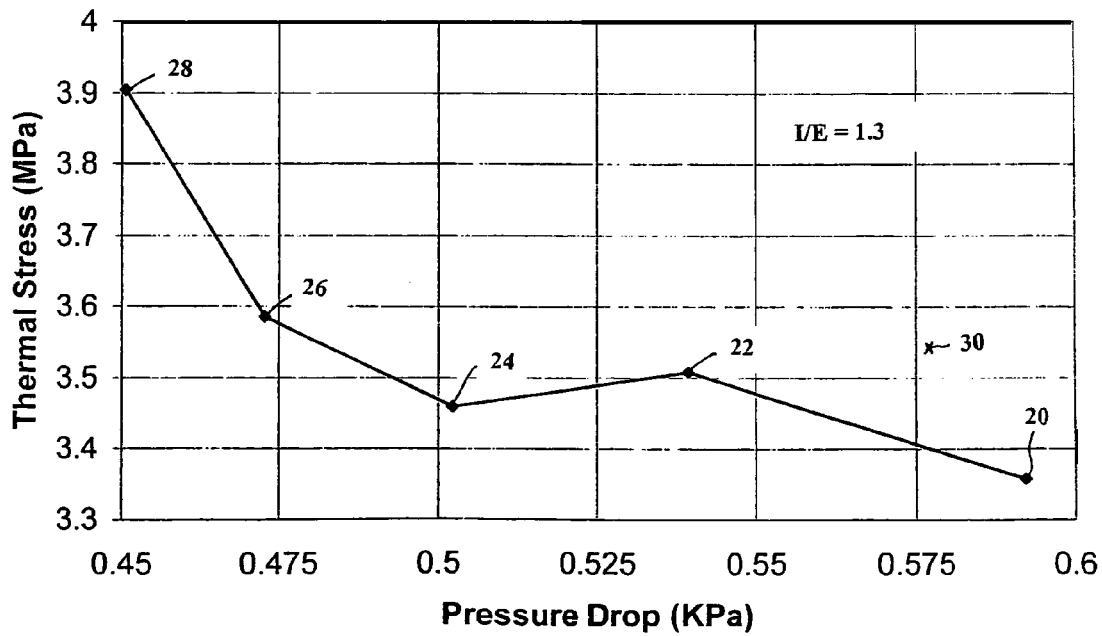

The inventors herein have further discovered that, as the corner radius, $R_c$, becomes larger, penalties due to higher thermal stress in the article become a dominant design consideration (See FIGS. 5-8). For example, FIGS. 5 and 7 illustrate plots of thermal stress (MPa) versus wall pressure drop (KPa) for designs including various fillet corner radii each having an I/E ratio of 1.3. For example, the point labeled 20 refers to an unfilleted design ($R_c$=0.00 inch); point 22 refers to a design with a 0.005 inch corner radius; point 24 has a 0.010 inch radius; point 26 has a 0.015 inch radius; and point 28 has an 0.020 inch radius. Thus, it should be apparent that although a larger radii is desired for mechanical stress and wall pressure drop reasons, for thermal stress reasons, the corner fillet radius should be minimized to some extent. Thus, there are competing design criteria concerning the corner radius. In particular, the corner radius for this design should be preferably less than 0.015 inch as shown by FIG. 5 as above that size radius, thermal stresses increase dramatically and at a high rate. Further limiting the corner radius to preferably less than about 0.012 inch thereby limits thermal stresses in the ceramic article to be approximately equal to or less than the beveled design (labeled 30) of equivalent thermal mass. Thus, it should be recognized that for designs having I/E ratios of about 1.3, it is desirable, in order to limit thermal stresses, that the following relationship is followed:

$$R_c \leq 1.0\, t_4.$$

Figure 8:
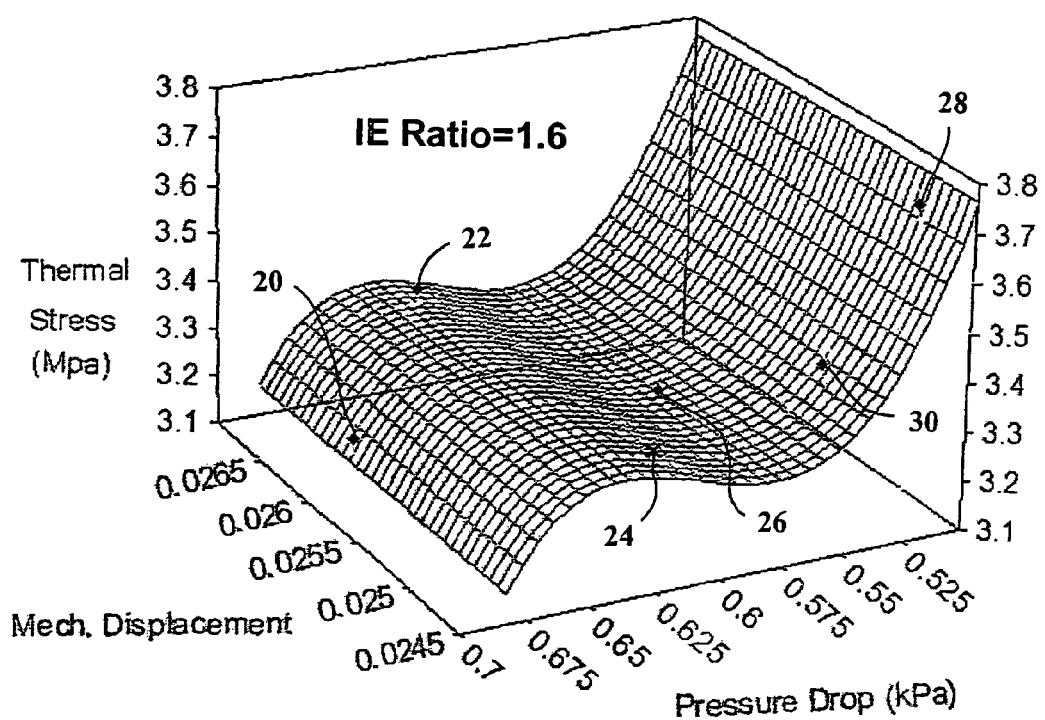

FIGS. 6 and 8 illustrate plots of thermal stress (MPa) versus pressure drop (KPa) in the same way as FIGS. 5 and 7, except that these designs all have an I/E ratio of 1.6. As shown therein, point 20 refers to an unfilleted design; point 22 refers to a design with a 0.005 inch corner radius, $R_c$; point 24 is design with a 0.010 inch radius; point 26 refers to a design with a 0.015 inch radius; and point 28 is a design with a 0.020 inch radius. A comparable thermal mass beveled design is labeled 30. Thus, it should be recognized that for designs having I/E ratios of about 1.6, it is also desirable, in order to limit thermal stresses, to design the corner radius, $R_c$, such that:

$$R_c \leq 1.0\, t_4,$$

and in order to have thermal stress equal to or lower than an equivalent thermal mass beveled design with lower wall pressure drop than comparable beveled designs, then it is desired that:

$$0.50\, T_4 \leq R_c \leq 1.0\, t_4.$$

Thus, it has been discovered that for designs having an I/E ratio of between 1.2 to 1.6, fillets are most desired. Designs having corner fillet radiuses following the relationship:

$$0.30\, t_4 \leq R_c \leq 1.0\, t_4,$$

are most desired because they exhibit low pressure drop and low thermal stress as well as low principle stress. Even more preferred designs include filleted corners with the following the relationship:

$$0.50\, t_4 \leq R_c \leq 0.75\, t_4.$$

This range takes advantage of the lower pressure drops achievable, while limiting the thermal stresses produced within the article in use. Most preferably, I/E ratios are desired to be between 1.2 and 1.5. As should be seen from FIG. 5, for designs having I/E ratio of about 1.3, a minima (at point 24) is included in the plot of stress versus pressure drop. This plot illustrates that designs having filleted corners with $0.30\, t_4 \leq R_c \leq 1.0\, t_4$ have combinations of low wall pressure drop and low thermal stress. Further, FIGS. 5-6 demonstrate that for I/E ratios of between about 1.3 and 1.6, certain filleted designs are generally preferable over designs having beveled corners in that they have combinations of lower wall pressure drop and comparable or lower thermal stresses.

Figure 2D:
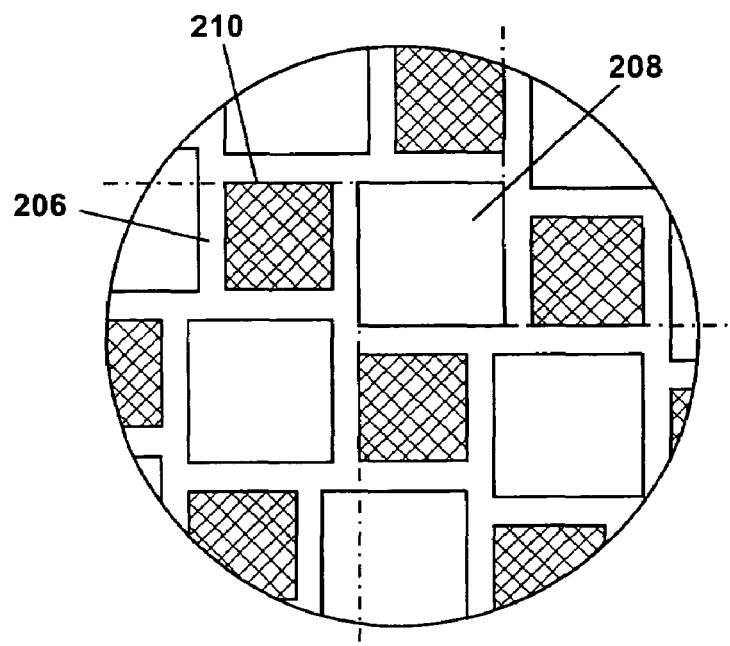
FIG. 2D shows a honeycomb cell structure having inlet and outlet cells with unequal hydraulic diameters and aligned edges according to another embodiment of the invention.
Figure 2E:
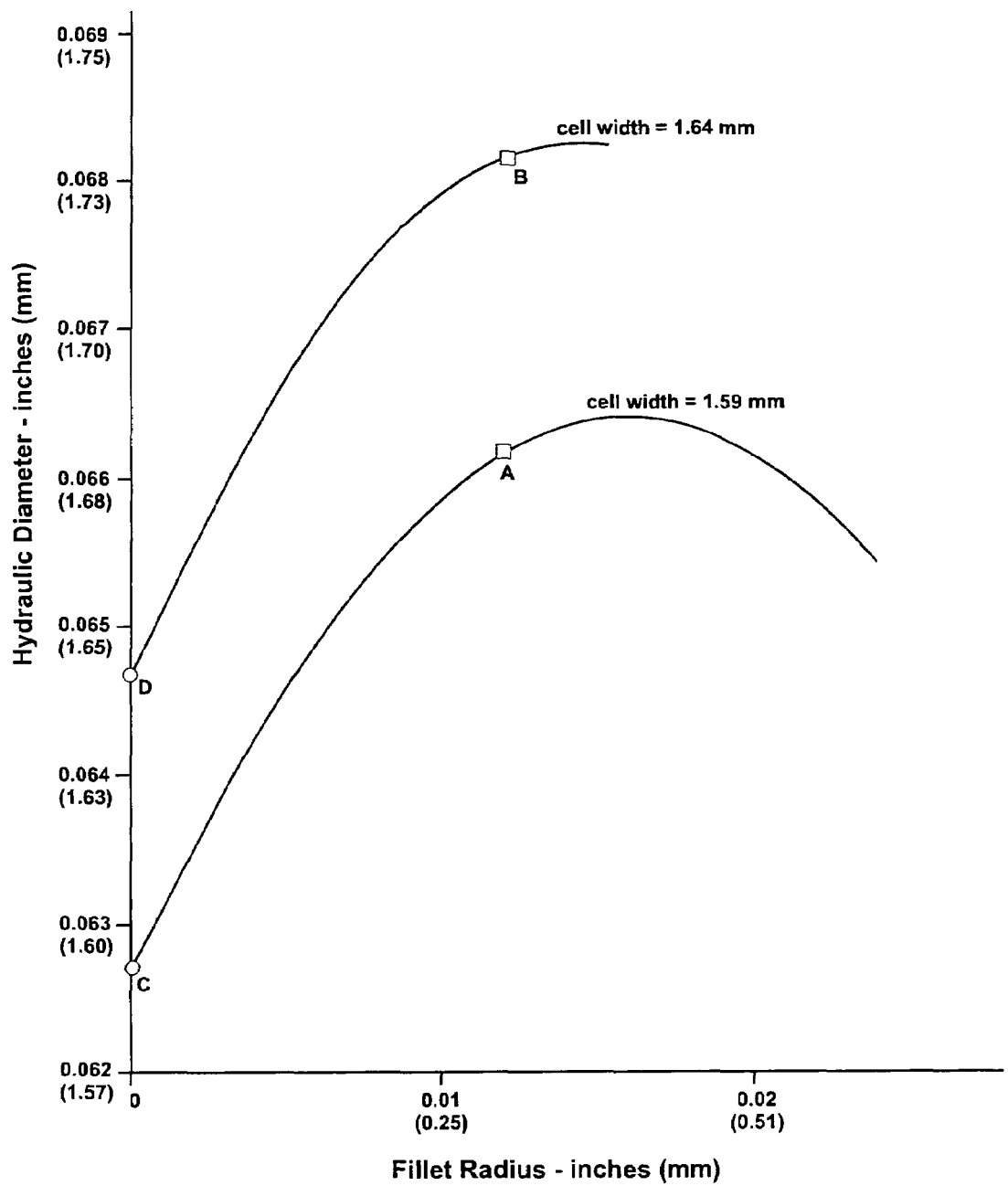
FIG. 2E is a graph of hydraulic diameter of a cell as a function of fillet radius and cell width.

FIG. 2D shows another cell structure where the edges of the inlet cells 208 are aligned with edges of the outlet cells 210 and the thickness of the porous walls 206 is uniform throughout the honeycomb filter without the use of a bevel or fillet at the corners of the inlet cells 208. However, a fillet or bevel to the corners of the inlet cells 208 can further improve the structural strength of the honeycomb filter. The porous walls 206 in this embodiment are even less straight than the porous walls in the embodiments previously described, leading to further improvement in thermal shock resistance.

Figure 3:
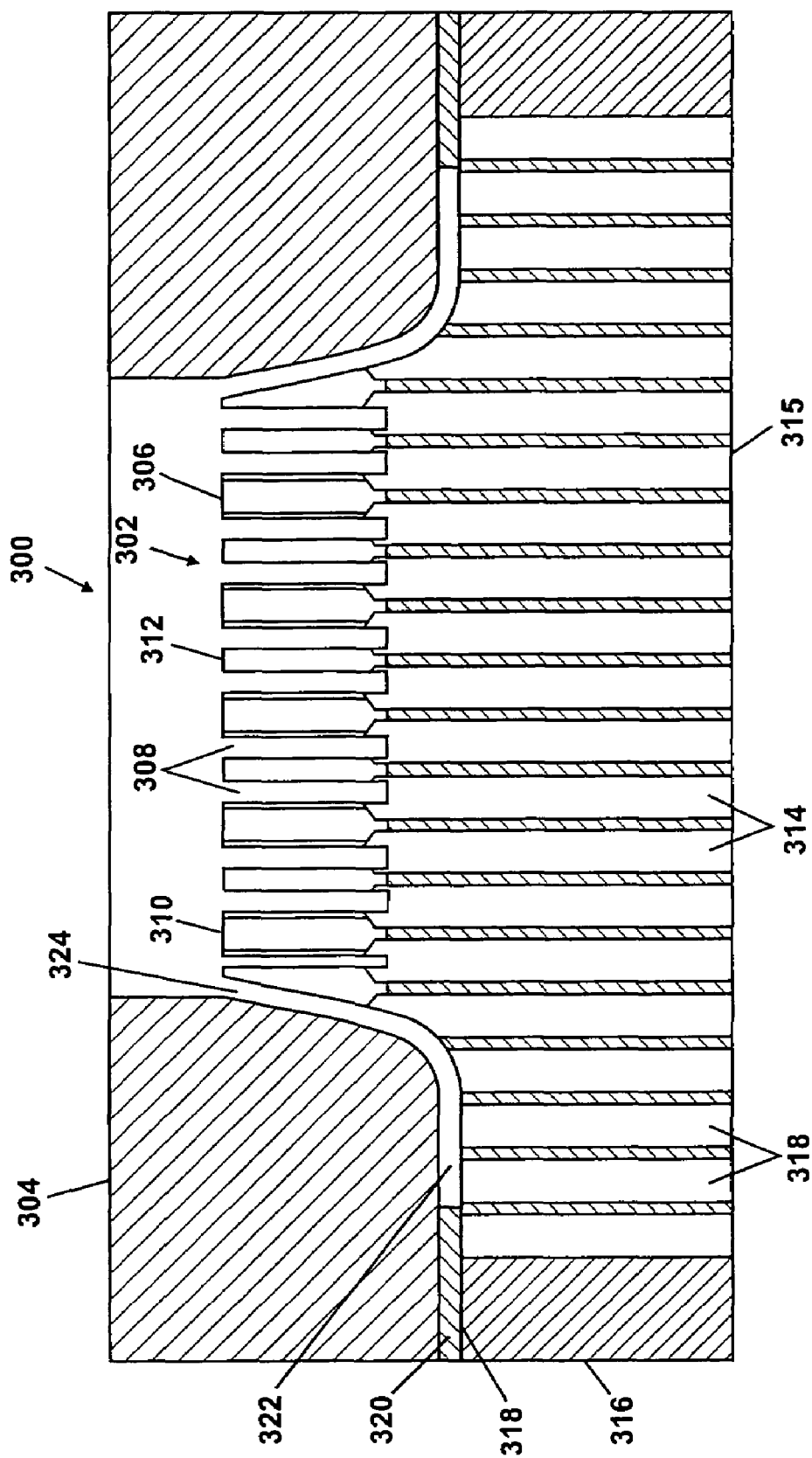
FIG. 3 is a cross-section of an extrusion die assembly according to one embodiment of the invention.

Honeycomb extrusion dies suitable for the manufacture of the honeycomb filter described above would have pin arrays including pins of alternating size. The corners of alternating pins could be rounded or beveled. For illustration purposes, FIG. 3 shows a vertical cross-section of an extrusion die assembly 300. The extrusion die assembly 300 includes a cell forming die 302 and a skin forming mask 304. The cell forming die 300 is used to form the interconnecting porous walls that define the inlet and outlet cells of the honeycomb filter. The cell forming die 302 cooperate with the skin forming mask 304 to define the shape and thickness of the skin of the honeycomb filter. The cell forming die 302 has a central region 306. An array of discharge slots 308 is cut in the central region 306 to define an array of inlet and outlet pins 310, 312. In one embodiment, the transverse cross-section of the inlet and outlet pins 310, 312 is square, with each corner of the inlet pins 310 including a fillet or bevel.

The central region 306 of the cell forming die 302 further includes an array of central feedholes 314, which extend from the inlet face 315 of the die to the array of discharge slots 308. The central feedholes 314 supply batch material to the discharge slots 308. The size and location of the central feedholes 314 relative to the discharge slots 308 are selected to achieve a desired flow rate through the discharge slots 308. As an example, a central feedhole 308 may correspond to each or every other discharge slot 308 or may correspond to each or every other intersection of the discharge slots 308.

The cell forming die 302 also includes a peripheral region 316 formed contiguous with the central region 306. The peripheral region 316 provides a mounting surface 318 for the skin forming mask 304 and includes feedholes 318 for feeding batch material to spaces around the cell forming die 302. In one embodiment, a shim 320 is interposed between the mounting surface 318 and the skin forming mask 304 to define a skin forming reservoir 322 between the peripheral region 316 and the skin forming mask 304. The feedholes 318 in the peripheral region 316 supply batch material to the skin forming reservoir 322. The skin forming mask 304 is radially spaced from the central region 306 to define a skin slot 324, which is in communication with the skin forming reservoir 322. Batch material is extruded through the skin slot 324 to form the skin of the honeycomb filter. The volume of the reservoir 322 can be adjusted to control the rate at which batch material is supplied into the skin slot 324.

In operation, batch material is fed into the feedholes 314, 318 in the cell forming die 302 and extruded through the discharge slots 308 and the skin forming slot 324. The volume of the batch material in the skin forming reservoir 322 is dependent on the extent of the radial overhang of the skin forming mask 304 over the skin forming reservoir 322. The rate of flow of batch material into the skin forming slot determines the character of the skin, while the rate of flow of batch material into the discharge slots determine the character of the porous walls.

The extrusion die assembly described above can be manufactured using existing methods for making extrusion dies. The cell forming die may be made by machining holes in a lower portion of a block that is made of a machinable material. These holes would serve as feedholes. A process such as plunge electrical discharge machining can be used to cut the discharge slots in the upper portion of the block. Pins remain on the upper portion of the block after the slots are cut. The pins at the periphery of the block can be shortened or completely removed to provide a mounting surface for the skin forming mask. The discharge slots could have any of the geometries described above in conjunction with the cell structure of the honeycomb filter.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A honeycomb filter, comprising:
an array of interconnecting porous walls which define an array of first channels and second channels, the first channels being bordered on their sides by the second channels and having a larger hydraulic diameter than the second channels, the first channels having a square cross-section, with corners of the first channels having a shape such that the thickness ($t_3$) of the porous walls adjoining corners of the first channels is comparable to the thickness ($t_4$) of the porous walls adjoining edges of the first and the second channels.

2. The honeycomb filter of claim 1, wherein the shape includes a fillet.

3. The honeycomb filter of claim 2, wherein the fillet includes a radius, $R_c$, wherein $R_c \geq 0.30\, t_4$.

4. The honeycomb filter of claim 3, wherein an I/E ratio, defined as a width dimension of the first channels divided by a width dimension of the second channels, is less than 1.5.

5. The honeycomb filter of claim 3, wherein an I/E ratio, defined as a width dimension of the first channels divided by a width dimension of the second channels, is above 1.5 and wherein $R_c \geq 0.50\, t_4$.

6. The honeycomb filter of claim 2, wherein the fillet includes a radius, $R_c$, and wherein $R_c \leq 1.0\, t_4$.

7. The honeycomb filter of claim 2, wherein the fillet includes a radius, $R_c$, and wherein $0.50\, T_4 \leq R_c \leq 1.0\, t_4$.

8. The honeycomb filter of claim 2, wherein the fillet includes a radius, $R_c$, and wherein $0.30\, t_4 \leq R_c \leq 1.0\, t_4$.

9. The honeycomb filter of claim 1, wherein the thickness ($t_3$) of the porous walls adjoining the corners is in a range of about 0.8 to 1.2 times the thickness ($t_4$) of the porous walls adjoining edges of the first and the second channels.

10. The honeycomb filter of claim 1, wherein an I/E ratio, defined as a width dimension of the first channels divided by a width dimension of the second channels, is between 1.1 to 1.5.

11. The honeycomb filter of claim 10, wherein the I/E ratio is between 1.2 to 1.4.

12. The honeycomb filter of claim 1, wherein edges of diagonally-adjacent first channels are substantially aligned.

13. The honeycomb filter of claim 1, wherein the second channels have a square cross-section.

14. The honeycomb filter of claim 1, wherein a ratio of the hydraulic diameter of the first channels to the hydraulic diameter of the second channels is in a range from 1.1 to 2.0.

15. The honeycomb filter of claim 1, wherein the first channels are end-plugged at a first end of the honeycomb filter and the second channels are end-plugged at a second end of the honeycomb filter so that flow into the first channels pass through the porous walls and then out of the honeycomb filter through the second channels.

16. A honeycomb filter, comprising:
an array of interconnecting porous walls defining an array of first channels and second channels, the first channels being bordered on their sides by the second channels and having a larger hydraulic diameter than the second channels wherein a ratio of the hydraulic diameter of the first channels to the hydraulic diameter of the second channels is between 1.1 to 1.5, the first channels have a square cross-section, with corners having a fillet with a corner radius, $R_c$, such that a thickness ($t_3$) of the porous walls adjoining corners of the first channels is in a range of about 0.8 to 1.2 times the thickness ($t_4$) of the porous walls adjoining edges of the first and the second channels and wherein $0.30\, t_4 \leq R_c \leq 1.0\, t_4$.

* * * * *